US007560173B2

(12) United States Patent
Brugger et al.

(10) Patent No.: US 7,560,173 B2
(45) Date of Patent: Jul. 14, 2009

(54) ELECTRICALLY ACTIVE FILMS

(75) Inventors: Pierre-Alain Brugger, Ependes (CH); Martin Staiger, Clarens (CH); Rolf Steiger, Praroman (CH)

(73) Assignee: Ilford Imaging Switzerland GmbH (CH)

( * ) Notice: Subject to any disclaimer, the term of this patent is extended or adjusted under 35 U.S.C. 154(b) by 891 days.

(21) Appl. No.: 10/472,782

(22) PCT Filed: Mar. 15, 2002

(86) PCT No.: PCT/EP02/02890

§ 371 (c)(1),
(2), (4) Date: Sep. 22, 2003

(87) PCT Pub. No.: WO02/074039

PCT Pub. Date: Sep. 26, 2002

(65) Prior Publication Data

US 2005/0075913 A1 Apr. 7, 2005
US 2006/0036474 A9 Feb. 16, 2006

(30) Foreign Application Priority Data

Mar. 20, 2001 (EP) .................................. 01810275

(51) Int. Cl.
*B32B 15/08* (2006.01)
(52) U.S. Cl. .................. 428/626; 428/632; 428/329; 428/702; 427/126.3; 427/126.5; 427/126.6; 427/383.1; 427/384; 427/419.1; 427/419.2
(58) Field of Classification Search ............... 428/626, 428/632, 323, 328, 329, 689, 702, 232; 427/126.3, 427/126.5, 126.6, 383.1, 419.2, 384, 419.1
See application file for complete search history.

(56) References Cited

U.S. PATENT DOCUMENTS 4,416,963 A * 11/1983 Takimoto et al. .............. 430/69

(Continued)

FOREIGN PATENT DOCUMENTS

EP 0 709 906 A1 5/1996

(Continued)

OTHER PUBLICATIONS

Lakhwani S et al. "Adsorption of Polyvinylpyrrolidone (PVP) and its effect on the Consolidation of Suspensions of Nancrystalline $CEO_2$ Particles" Journal of Materials Science, Chapman and Hall Ltd. London, GB, Bd. 34, Nr. 16, Aug. 15, 1999, Seiten 3909-3912, XP-000851673—ISSN: 0022-2461.

(Continued)

*Primary Examiner*—John J. Zimmerman
*Assistant Examiner*—Aaron Austin
(74) *Attorney, Agent, or Firm*—Onofrio Law; Dara L. Onofrio, Esq.

(57) ABSTRACT

An electrically active film and a process for its preparation at low temperatures are described. The electrically active film consists of a support having coated thereon at least one electrically active layer which contains nanocrystalline, nanoporous transition metal oxides, transition metal chalcogenides or their lithium inclusion complexes and, optionally, auxiliary, electrically non-active layers, wherein the electrically active layers still contain a binder or a mixture of binders at the end of the preparation process.

10 Claims, 2 Drawing Sheets

U.S. PATENT DOCUMENTS

| | | | | |
|---|---|---|---|---|
| 4,895,704 | A | * | 1/1990 | Arai et al. .................. 422/57 |
| 5,211,933 | A | | 5/1993 | Barboux et al. |
| 5,382,494 | A | * | 1/1995 | Kudo et al. .................. 430/140 |
| 5,604,057 | A | | 2/1997 | Nazri |
| 5,674,644 | A | | 10/1997 | Nazri |
| 5,700,442 | A | | 12/1997 | Bloch et al. |
| 6,309,564 | B1 | * | 10/2001 | Harada et al. ............... 252/587 |
| 6,538,194 | B1 | * | 3/2003 | Koyanagi et al. ............ 136/256 |
| 6,849,327 | B1 | * | 2/2005 | Ikuhara et al. .............. 428/339 |

FOREIGN PATENT DOCUMENTS

| | | | |
|---|---|---|---|
| EP | 0 814 524 | A1 | 12/1997 |
| JP | 2001-172545 | * | 6/2001 |
| WO | WO 97/15959 | | 5/1997 |
| WO | WO 99/59218 | | 11/1999 |
| WO | WO 99/63614 | * | 12/1999 |

OTHER PUBLICATIONS

Huang S-Y et al. "Nanocrystalling $TIO_2$ Electrodes Exhibiting High Storage Capacity and Stability in Rechargeable Lithium Batteries" Active and Passive Electronic Components, Gordon and Breach, New York, New York, US, Bd. 18, Nr. 1, 1995, Seiten 23-30, XP-001023471—ISSN: 0882-7516.

Pichot F et al. "Flexible Solid-State Photoelectrochromic Windows" Journal of the Electrochemical Society, Bd. 146, Nr. 11, 1999, Seiten 4324-4326, XP-002183515—Electrochemical Society. Manchester, New Hampshire, US.

Pichot F et al. "Low-Temperature Sintering of $TIO_2$ Colloids: Application to Flexibledye-Sensitized Solar Cells" Langmuir, American Chemical Society, NewYork, NewYork—US, Bd. 16, Nr. 13, Jun. 27, 2000, Seiten 5626-5630, XP-001020767—ISSN: 0743-7463.

Michalak F et al. "A Flexible Electrochromic device based on Colloidal Tungsten Oxide and Polyaniline" Solid State Ionics, North Holland Pub. Company. Amsterdam NL, Bd. 85, Nr. 1, May 1, 1996, Seiten 265-272, XP-004050502—ISSN: 0167-2738.

Vacassy H et al. "Influence of the Particle Size of Electrode Materials on Intercalation Rate and Capacity of New Electrodes", Journal of Power Sources 81-82, 621-626 (1999), Lausanne, Switzerland.

R.G. Gordon, "Criteria of Choosing Transparent Conductors", MRS Bulletin 25, 52-57 (Aug. 2000).

V. Shklover and M. Graetzel, "Nanocrystalline Titanium Oxide Electrodes for Photovoltaic Applications", Journal of the American Ceramic Society 80 3157-3171 Mar. 1997, Lausanne, Switzerland.

* cited by examiner

ELECTRICALLY ACTIVE FILMS

FIELD OF THE INVENTION

The present invention relates to electrically active films comprising a support having coated thereon a layer containing nanocrystalline, nanoporous transition metal oxides, transition metal chalcogenides or their lithium inclusion compounds together with a binder and a process for their preparation at low temperatures.

BACKGROUND OF THE INVENTION

Electrically active films, which contain nanocrystalline, nanoporous transition metal oxides or transition metal chalcogenides or their lithium inclusion compounds, are used as electrodes in primary or secondary electrochemical generators, as described for example in patent application WO 99/59,218. These electrically active films are further used in photovoltaic cells or in electrochromic displays.

In patent application EP 0,709,906 a positive electrode is described consisting of sintered particles of oxygen containing lithium compounds of a size of 33 μm. These particles are heated under pressure at a temperature between 350° C. and 1000° C. in order to attain the required electrical activity.

In U.S. Pat. No. 5,604,057 a cathode is described consisting of amorphous, nanoporous particles of manganese oxide including lithium ions of sub micrometer size having an internal surface greater than 100 m$^2$/g. These electrodes are prepared by coating the manganese oxide together with a preferentially conductive binder or a mixture of binders onto a conductive support (as for example an aluminium foil). Coating may be effected by spraying, spin coating, blade coating or painting. Subsequently the coated support has to be heated, but not to a temperature exceeding 400° C. in order to prevent crystallization of the manganese dioxide.

In U.S. Pat. Nos. 5,211,933 and 5,674,644 a preparation method for LiMn$_2$O$_4$ with spinel structure and for LiCoO$_2$ with a layer structure is described, wherein the compounds are prepared from acetate precursors. The powder of LiMn$_2$O$_4$ prepared in this way consists of particles having a size from 0.3 μm to 1.0 μm. Pressed tablets of this powder, with the addition of 10% of small graphite particles, are used as positive electrode in lithium batteries. Conductivity between the individual tablets is caused by the graphite particles. LiMn$_2$O$_4$ and LiCoO$_2$ may also be coated onto a support together with a binder. Afterwards the coated support is heated to a temperature of 600° C. During this heating step, the organic binder is completely removed from the layer. The finally obtained electrically active film therefore no longer contains any organic binder.

In U.S. Pat. No. 5,700,442 inclusion compounds of manganese dioxide are described which are used as positive electrode in lithium batteries. These inclusion compounds are prepared by heating of a β-MnO$_2$ powder with a lithium compound at a temperature between 150° C. and 500° C. for a sufficiently long period of time. The particles prepared in this way are relatively coarse and have a specific surface below 7 m$^2$/g and are therefore not suitable as a material for active electrodes that may be discharged rapidly.

In patent application EP 0,814,524 lithium manganese oxides with spinel structure are described as active cathode material in secondary lithium ion batteries. The mean size of the particles is between 1 μm and 5 μm and the specific surface is between 2 m$^2$/g und 10 m$^2$/g. Due to the coarse particles and the low internal surface, these compounds are not suitable as a material for active electrodes that may be discharged rapidly.

In patent application WO 99/59,218 the preparation of electrodes consisting of TiO$_2$ and LiMn$_2$O$_4$ with the aid of a coating or printing process is described, wherein an aqueous suspension of a manganate precursor compound is deposited onto a substrate. This coating operation normally has to be repeated several times in order to obtain the required layer thickness. Subsequently the coated substrate has to be heated to a temperature between 400° C. und 750° C. in the presence of air for a few minutes in order to obtain the required conductivity. The sintering process at high temperatures leads to layers with higher electrical activity than a sintering process at lower temperatures.

The preparation of thin film electrodes at room temperature by coating aqueous suspensions of manganate powers containing 3% of polyvinyl alcohol and 10% of graphite onto conductive supports is mentioned in "Influence of the Particle Size of Electrode Materials on Intercalation Rate and Capacity of New Electrodes", Journal of Power Sources 81-82, 621-626 (1999). The layers are heated subsequently to a temperature of at least 200° C. during 15 minutes.

The known methods for the preparation of transparent conductors are listed in "Criteria for Choosing Transparent Conductors", MRS Bulletin 25, 52 (2000) (Table 1). Most of the preparation methods need high temperatures up to 1000° C.

All these preparation methods do not allow a cost effective production of electrically active films due to the required high temperatures and the long process times. In particular, it is not possible to use cheap, transparent, commercially available supports that are used for example in the photographic industry, because they would be destroyed at the high temperatures required. There is the further disadvantage of the required high temperatures that heat-sensitive compounds, in particular organic compounds such as spectral sensitizing dyes cannot be added to the electrically active films. Furthermore the mechanical stability of such electrically active films is not sufficient as well as the adhesion of the layers to the substrate.

SUMMARY OF THE INVENTION

Accordingly, it is an object of the invention to provide electrically active films containing binders with excellent mechanical stability using cost-effective production methods, which show a high electrical activity without removal of the binder in a sintering step at high temperatures.

A further object of the invention is the provision of such electrically active films having excellent mechanical stability using cost-effective coating methods at low temperatures, wherein suspensions containing a binder are deposited onto cheap organic plastic supports which are subsequently dried. These electrically active films show a high electrical activity even without removal of the binder in a sintering process at high temperature.

Such electrically active films comprise a support having coated thereon at least one electrically active layer containing binders and, optionally, one or more electrically inactive layers.

We have now found unexpectedly that such binder-containing films with high electrical activity may be prepared in a cost-effective way in large scale quantities by coating liquid suspensions or colloidal dispersions containing nanocrystalline, nanoporous transition metal oxides or transition metal chalcogenides or their lithium inclusion complexes together with a binder or a mixture of binders at temperatures between 5° C. and 95° C., optionally together with electrically inactive layers, onto commercially available plastic supports or paper supports and subsequent drying at temperatures below the boiling point (at standard pressure) of the suspension liquid. The temperature of the coated support or of the drying medium never exceeds the boiling point (at standard pressure) of the suspension liquid during the whole drying step and therefore all of the binder or the mixture of binders remains in the electrically active film together with the transition metal oxides or transition metal chalcogenides or their lithium inclusion complexes.

In a preferred embodiment of the invention, aqueous colloidal dispersions containing such nanocrystalline, nanoporous transition metal oxides or transition metal chalcogenides or their lithium inclusion complexes together with one or more film-forming, nonconducting binders are coated at temperatures between 20° C. and 55° C., optionally together with electrically inactive layers, onto plastic supports or metallized plastic supports and subsequently dried with a gas mixture, preferably air, at temperatures below 100° C., preferably below 60° C.

Preferred nanocrystalline, nanoporous transition metal oxides are titanium dioxide, preferably with anatase structure, and $LiMn_2O_4$ as lithium inclusion compound.

Other objects, features and advantages of the present invention will be apparent when the detailed description of the preferred embodiment of the invention are considered with reference to the drawings which should be construed in an illustrative and not limiting sense as follows:

DETAILED DESCRIPTION OF THE INVENTION

Figure 1:
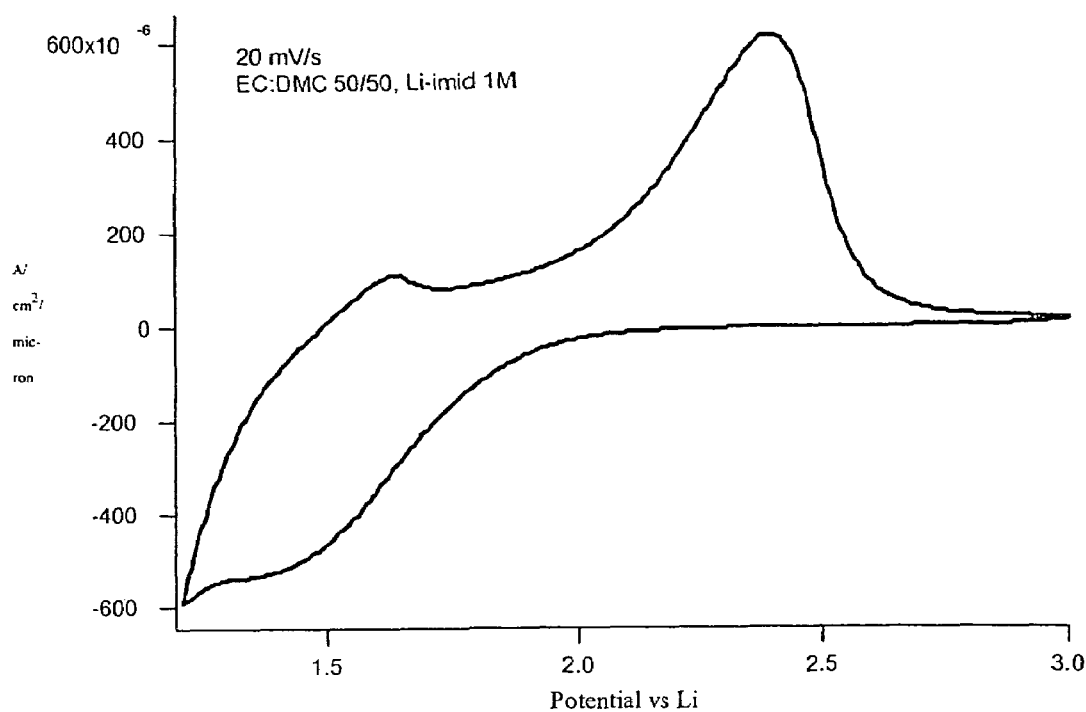
FIG. 1 illustrates the cyclic voltammogram of a support coated according to the present invention as described in Example 1.

The invention describes a method for the large scale production of films containing binders with high electrical activity, wherein liquid suspensions or colloidal dispersions containing nanocrystalline, nanoporous transition metal oxides or transition metal chalcogenides or their lithium inclusion complexes and a binder or a mixture of binders are coated at temperatures between 5° C. and 60° C., optionally together with electrically inactive layers, onto commercially available plastic supports or paper supports and subsequent drying at temperatures below the boiling point (at standard pressure) of the suspension liquid. The temperature of the coated support or of the drying medium never exceeds the boiling point (at standard pressure) of the suspension liquid during the whole drying step and therefore all of the binder or the mixture of binders remains in the electrically active layer of the electrically active film together with the transition metal oxides or transition metal chalcogenides or their lithium inclusion complexes.

In a preferred embodiment of the invention, aqueous colloidal dispersions containing such nanocrystalline, nanoporous transition metal oxides or transition metal chalcogenides or their lithium inclusion complexes together with one or more film-forming, nonconducting binders are coated at temperatures between 20° C. and 55° C., optionally together with electrically inactive layers, onto plastic supports or metallized plastic supports and subsequently dried with a gas mixture, preferably air, at temperatures below 100° C., preferably below 60° C.

Drying may also be done using. infrared radiation or in a combined drying step consisting of drying with a gas mixture and infrared drying.

Suitable nanocrystalline, nanoporous transition metal oxides and transition metal chalcogenides are oxides or chalcogenides of the transition metals such as $TiO_2$, $Ti_2O_3$, $Nb_2O_5$, $WO_3$, $V_2O_5$, $MoO_3$, $MnO_2$, $HfO_2$, $TiS_2$, $WS_2$, $TiSe_2$, $Fe_2O_3$, $Fe_3O_4$, $RuO_2$, $RuS_2$, $MoS_2$, $WS_2$, $IrO_2$, $CeO_2$, $InO_2$, $TaO_2$, $ZnO$, $SnO_2$, $BaTiO_3$, $SrTiO_3$ or indium tin oxide having specific surfaces between 10 $m^2/g$ and 400 $m^2/g$. Lithium inclusion compounds such as $LiMn_2O_4$, $LiNiO_2$, $LiCoO_2$ or $Li(NiCo)O_2$ may also be used.

Nanocrystalline, nanoporous transition metal oxides and the lithium inclusion compounds of such nanocrystalline, nanoporous transition metal oxides are preferred.

Especially preferred are titanium dioxide with anatase structure and $LiMn_2O_4$.

The size of these nanocrystalline, nanoporous primary particles is preferably from 10 nm to 500 nm, especially preferred from 10 nm to 100 nm.

In the case of $TiO_2$ the primary particles preferably have a size from 10 nm to 50 nm with a maximum of the size distribution at 25 nm.

In the case of $LiMn_2O_4$ the primary particles preferably have a size below 100 nm.

The electrically active films contain these nanocrystalline, nanoporous transition metal oxides and transition metal chalcogenides or their lithium inclusion compounds in a quantity of 1 $g/m^2$ to 100 $g/m^2$, preferably in a quantity of 3 $g/m^2$ to 50 $g/m^2$. These quantities correspond to a film thickness between 1 μm and 100 μm, respectively between 3 μm and 50 μm.

Preferred are electrically active films having coated onto the support an electrically active layer and on top of this layer an electrically inactive layer. Preferably the electrically inactive layer contains a film-forming binder and an electrically inactive pigment.

In an especially preferred embodiment of the invention the electrically inactive layer contains $\gamma$-$Al_2O_3$ as pigment and polyvinyl alcohol as binder, where the ratio between the binder and the pigment is from 1:5 und 1:40, particularly from 1:10 and 1:30, and where the thickness of the electrically inactive layer is from 2 μm to 20 μm, preferably from 4 μm to 15 μm.

The binders are in most cases water-soluble, nonconducting polymers. Film-forming, nonconducting polymers are preferred.

The water-soluble, nonconducting polymers include for example natural polymers or modified products thereof such as albumin, gelatine, casein, starch, gum arabicum, sodium or potassium alginate, hydroxyethylcellulose, carboxymethylcellulose, α-, β- or γ-cyclodextrine and the like. In the case where one of the water-soluble polymers is gelatine, all known types of gelatine may be used as for example acid pigskin or limed bone gelatine, acid or base hydrolysed gelatine.

A preferred natural, nonconducting, film-forming, binder is gelatine.

Synthetic, nonconducting binders may also be used and include for example polyvinyl alcohol; polyvinyl pyrrolidone; completely or partially saponified products of copolymers of vinyl acetate and other monomers; homopolymers or copolymers with monomers of unsaturated carboxylic acids such as (meth)acrylic acid, maleic acid, crotonic acid and the like. Homopolymers or copolymers of vinyl monomers of (meth)acrylamide; homopolymers or copolymers of other monomers with ethylene oxide; polyurethanes; polyacrylamides; water soluble nylon type polymers; polyesters; polyvinyl lactams; acrylamide polymers; substituted polyvinyl alcohol; polyvinyl acetals; polymers of alkyl and sulfoalkyl acrylates and methacrylates; hydrolysed polyvinyl acetates; polyamides; polyvinyl pyridines; polyacrylic acid; polyacryl nitrile; copolymers with maleic anhydride; polyalkylene oxides; methacrylamide copolymers and maleic acid copolymers or fluoropolymers such as polyvinylidenefluoride may also be used. All these polymers may also be used as mixtures.

Preferred synthetic nonconducting, film-forming binders are polyvinyl alcohol, polyvinylidenefluoride, polyethylene oxides, polyethylene glycols and polyacryl nitrile or mixtures thereof.

Polythiophenes, polyanilines, polyacetylenes, poly(3,4-ethylene)dioxythiophene and polyphenylenevinylene may be used as conducting, film-forming polymers. Poly(3,4-ethylene)dioxythiophene is preferred.

Small graphite particles or nanosize carbon tubes may be added to the nonconducting polymers.

These polymers may be blended with water insoluble natural or synthetic high molecular weight compounds, particularly with acrylate latices or with styrene acrylate latices.

Although water-insoluble, conducting or nonconducting, film-forming polymers are not specifically claimed in this invention, water-insoluble, conducting or nonconducting, film-forming polymers should nevertheless be considered to be part of the system.

The amount of the film-forming polymer should be as low as possible, but still sufficiently high in order to obtain coatings well adhering to the support. Suitable amounts are from 0.5% to 20% relative to the amount of the total quantity of all the nanocrystalline, nanoporous transition metal oxides, transition metal chalcogenides or lithium inclusion compounds. Preferred are quantities from 1% to 10%, in particular from 2% to 5%.

The polymers mentioned above having groups with the possibility to react with a cross-linking agent can be cross-linked or hardened to form essentially water insoluble layers. Such cross-linking bonds may be either covalent or ionic. Cross-linking or hardening of the layers allows for the modification of the physical properties of the layers, like for instance in water take-up of the layer or in resistance against layer damage.

The cross-linking agents or hardeners are selected depending on the water-soluble polymers used.

Organic cross-linking agents and hardeners include for example aldehydes (such as formaldehyde, glyoxal or glutaraldehyde), N-methylol compounds (such as dimethylol urea or methyloldimethylhydantoin), dioxanes (such as 2,3-dihydroxydioxane), reactive vinyl compounds (such as 1,3,5-trisacrylolyl-hexahydro-s-triazine or bis-(vinylsulfonyl) methyl ether), reactive halogen compounds (such as 2,4-dichloro-6-hydroxy-s-triazine), epoxides, aziridines, carbamoyl pyridinium compounds, melamine resins or mixtures of two or more of these above mentioned cross-linking agents.

Inorganic cross-linking agents or hardeners include for example chromium alum, aluminium alum, boric acid, zirconium compounds or titanocenes.

The layers may also contain reactive substances that cross-link the layers under the influence of ultraviolet light, electron beams, X-rays or heat.

Electrically active films having coated on a support an electrically active layer and on top of this layer an electrically inactive layer are hardened additionally with a cross-linking agent adapted to the polymer in the electrically inactive layer in order to obtain an excellent mechanical stability. In the case where polyvinyl alcohol is used in the electrically inactive layer, boric acid or borates are suitable cross-linking agents.

A wide variety of supports are known and commonly used in the photographic industry. For the manufacture of electrically active films all those supports used in the manufacture of photographic materials may be used, such as transparent films made from cellulose esters such as cellulose triacetate, cellulose acetate, cellulose propionate or cellulose acetate/butyrate, polyesters such as polyethylene terephthalate or polyethylene naphthalate, polyamides, polycarbonates, polyimides, polyolefins, polyvinyl acetals, polyethers, polyvinyl chloride and polysulfonamides. Polyester film supports, and especially polyethylene terephthalate or polyethylene naphthalate are preferred because of their excellent dimensional stability characteristics. The usual opaque supports used in the manufacture of photographic materials may be used including for example baryta paper, polyethylene coated papers, voided polyester as for instance manufactured by DuPont under the trade name of Melinex®. Especially preferred are polyolefin-coated papers or voided polyester. All of these supports may also have a conducting metallic layer on their surface.

Plain papers, comprising all different types of papers varying widely in their composition and in their properties, may also be used as supports. Pigmented papers and cast-coated papers may be used as well.

Metal foils, such as foils made from aluminium, may also be used as supports for electrically active films, as well as plastic supports having a highly conducting layer at their surface. Metallized plastic supports or plastic supports having a layer of indium tin oxide on their surface are preferred.

The electrically active layers are in general coated from aqueous solutions or dispersions containing all necessary ingredients. In many cases, surfactants are added to those coating solutions in order to improve the coating behavior and the evenness of the layers. Although not specifically claimed in this invention, surfactants nevertheless form an important part of the invention.

The coating solutions may be coated onto the support by any number of suitable procedures. The coating methods include for example extrusion coating, air knife coating, doctor blade coating, cascade coating and curtain coating. The coating solutions may also be applied using spray techniques, intaglio or offset printing. The electrically active may be coated in different coating passes. It is likewise possible to coat a support on both sides with electrically active layers. The selected coating procedure however is not to be considered limiting for the present invention.

The coating speed depends on the coating procedure used and may be varied within big limits. Curtain coating at speeds between 30 m/min and 300 m/min is the preferred coating procedure.

The support having coated thereon the electrically active layers, optionally together with electrically inactive layers, is dried immediately after coating. The temperature of the support or of the drying medium never exceeds during the whole production process the boiling point (at standard pressure) of the suspension liquid.

The temperature of the coating solution containing these nanocrystalline, nanoporous transition metal oxides or transition metal chalcogenides or their lithium inclusion compounds and the binder or mixture of binders is between 20° C.

und 60° C. and the temperature of the drying medium, in particular air, never exceeds 100° C., preferentially it never exceeds 60° C.

The present invention is illustrated in more detail by the following examples without limiting or restricting the scope of the invention in any way.

EXAMPLES

Example 1

Preparation of an Aqueous Dispersion of Titanium Dioxide 24.6 g of nanocrystalline, nanoporous $TiO_2$ (P25 (anatase structure), available from Degussa-Hüls AG, Frankfurt am Main, Germany) were dispersed by exposure to ultrasound for a few minutes at a temperature of 40° C. in 170 g of deionized water. Afterwards the value of pH of the dispersion was adjusted to 4.50 by the addition of a solution of potassium hydroxide (1%). After a further exposure to ultrasound, the total weight was adjusted to 200 g with deionized water. The dispersion of P25 prepared in this way contained 12.3% by weight of $TiO_2$.

Preparation of the Coating Solution 65.04 g of this dispersion were mixed with 7.2 g of deionized water at a temperature of 40° C. Afterwards 4.27 g of a solution of polyethylene glycol (7.5%, molecular weight 100'000, available from Fluka Chemie AG, Buchs, Switzerland) were added, the total weight of the mixture was adjusted to 80 g with deionized water and the solution was exposed to ultrasound for a few minutes.

Coating 100 g/m² of this coating solution were coated at a temperature of 40° C. with a bar coater onto a thin, transparent polyethylene terephthalate support having glued onto its surface a thin copper foil. Afterwards the coated support was dried for 60 minutes at a temperature of 30° C. 1 m² of the coated support contains 10 g of $TiO_2$ and 0.4 g of polyethylene glycol.

Comparative Example C-1

A sintered layer of nanocrystalline, nanoporous, sintered $TiO_2$, prepared by the method described in "Nanocrystalline Titanium Oxide Electrodes for Photovoltaic Applications", Journal of the American Ceramic Society 80, 3157-3171 (1997). $TiO_2$ is mixed with polyethylene glycol (molecular weight 25'000) and water. The resulting paste was deposited onto a glass plate coated with conducting tin oxide and heated for 20 minutes in the presence of air at a temperature of 400° C. The organic binder was destroyed and removed from the coated layer by this treatment.

Example 2

Preparation of an Aqueous Dispersion of Lithium Manganate 100.0 g of cathode powder SP 30 (available from Merck, Darmstadt, Germany) were dispersed in ethanol and subsequently milled in a ball mill for 3 hours. The milled powder was dried at a temperature of 40° C. 20.0 g of this nanocrystalline, nanoporous $LiMn_2O_4$ were dispersed in 65.8 g of deionized water by exposure to ultrasound for a few minutes.

Preparation of the Coating Solution 10.67 g of a solution of polyethylene glycol (7.5%, molecular weight 100'000) were added to 65.8 g of this dispersion at a temperature of 40° C., the total weight of the mixture was adjusted to 100 g with deionised water and the mixture was exposed for a few minutes to ultrasound.

Coating 24 g/m² of this coating solution were coated at a temperature of 40° C. with a bar coater onto a thin, transparent polyethylene terephthalate support having on its surface a thin evaporated layer of indium tin oxide. Afterwards the coated support was dried for 60 minutes at a temperature of 30° C. 1 m² of the coated support contains 4.8 g of $LiMn_2O_4$ and 0.2 g of polyethylene glycol.

Comparative Example C-2

A sintered layer of nanocrystalline, nanoporous, sintered $LiMn_2O_4$, prepared by the method described in "Journal of the American Ceramic Society" 80, 3157-3171 (1997), was used in this comparative example. $LiMn_2O_4$ was mixed with polyethylene glycol (molecular weight 25'000) and water. The resulting paste was deposited onto a glass plate coated with conducting tin oxide and heated for 20 minutes in the presence of air at a temperature of 400° C. The organic binder was destroyed and removed from the coated layer by this treatment.

Example 3

Coating 45 g/m² of the coating solution of Example 1 were coated at a temperature of 40° C. with a bar coater onto a thin, transparent polyethylene terephthalate support having glued onto its surface a thin copper foil. Afterwards the coated support was dried for 60 minutes at a temperature of 30° C. 1 m² of the coated support contains 4.5 g of $TiO_2$ and 0.18 g of polyethylene glycol.

Example 4

Double Layer System

Preparation of the Coating Solution for the Upper Layer 14.5 g of aluminium oxide C (Content 96.6% of $Al_2O_3$, available from Degussa-Hüls AG, Frankfurt am Main, Germany) were dispersed under efficient mechanical stirring at a temperature of 25° C. in 62.9 g of deionized water and 0.2 g of aqueous lactic acid (90%). After 60 minutes of stirring 15.47 g of an aqueous solution of polyvinyl alcohol (7.5%, hydrolysis degree 98%-99%, molecular weight 85'000 to 146'000, available from ALDRICH Chemie, Buchs, Switzerland) were added, the coating solution was exposed to ultrasound and the total weight was adjusted to 100 g with deionized water.

Coating (Upper Layer)

40 g/m² of this coating solution, after the addition of boric acid as cross-linking agent, were coated at a temperature of 40° C. with a bar coater onto the coated support of Example 3. Afterwards the support coated with the two layers was dried for 60 minutes at a temperature of 30° C. 1 m² of the coated support contains 4.5 g of $TiO_2$, 0.18 g of polyethylene glycol, 6.04 g of $Al_2O_3$ and 0.76 g of polyvinyl alcohol.

Cyclic voltammetry was used to determine the electric activity of the electrically active films described herein.

Figure 2:
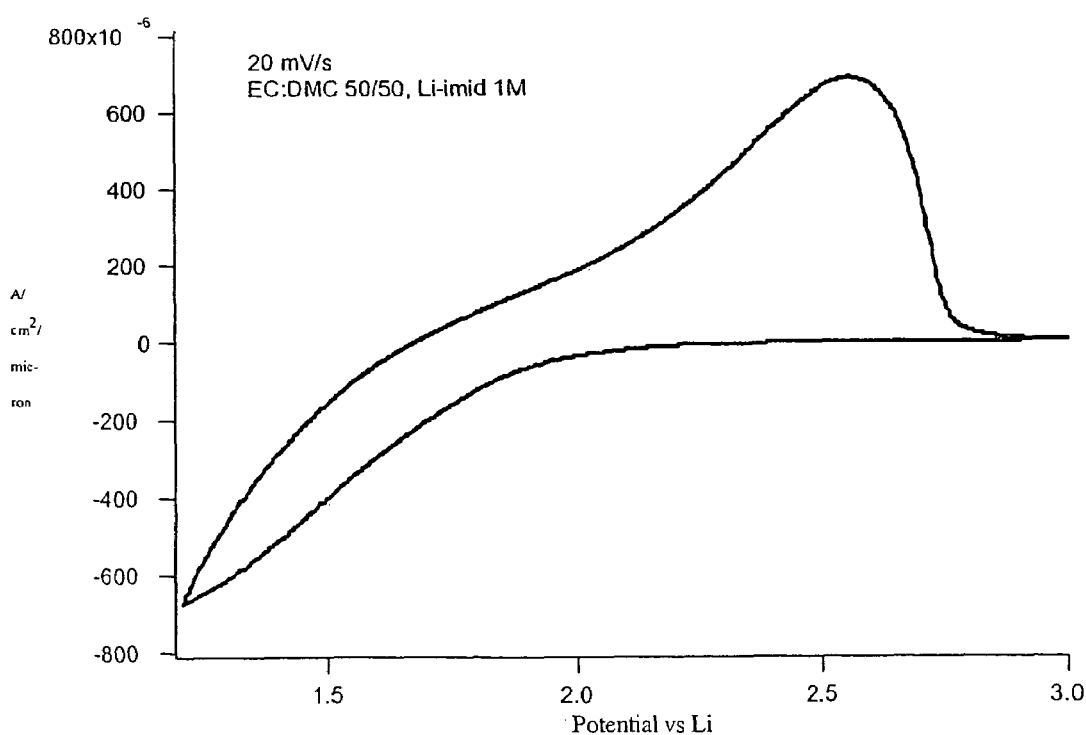
FIG. 2 illustrates the cyclic voltammogram of Comparative example C-1.

The cyclic voltammogram of the support coated with $TiO_2$ according to our invention (Example 1) is recorded in FIG. 1; the cyclic voltammogram of an electrically active film containing sintered $TiO_2$, prepared according to the state of the art (Comparative example C-1) is recorded in FIG. 2. These two figured immediately show that the electrical activity of the electrically active film according to our invention (Example 1, without high temperature treatment) is as high as that of an electrically active film prepared according to the state of the art (Comparative example C-1, with high temperature treatment).

Figure 3:
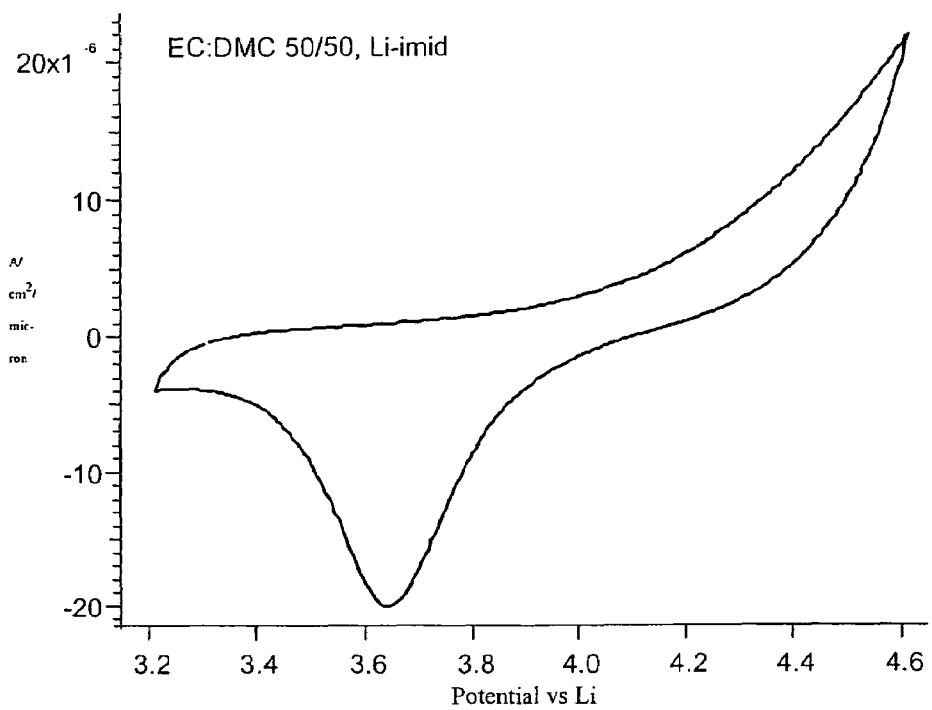
FIG. 3 illustrates the cyclic voltammogram of a support coated according to the present invention as described in Example 2.
Figure 4:
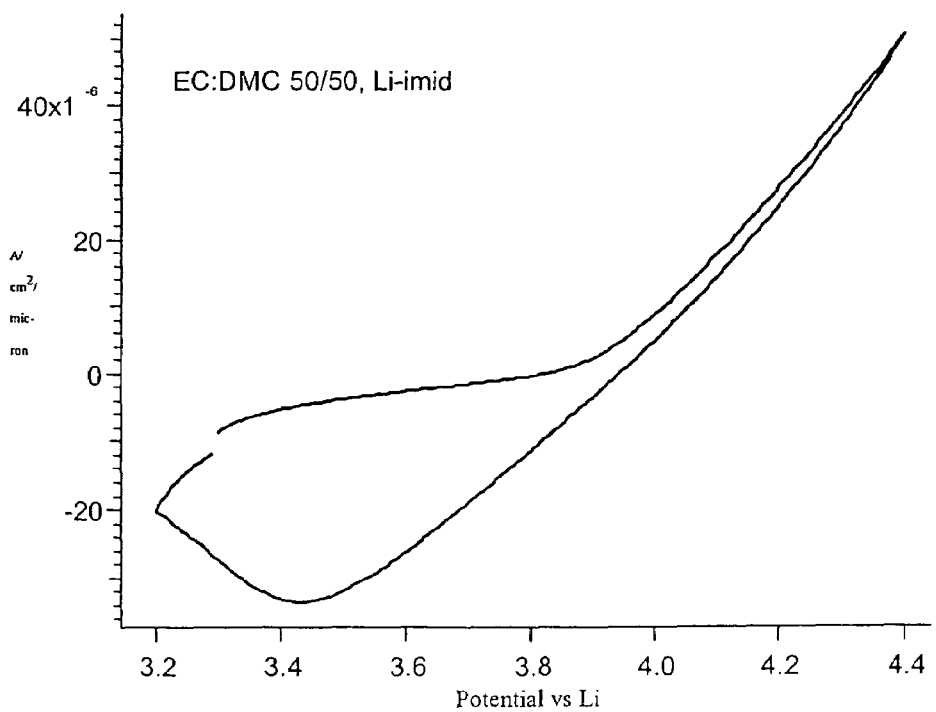
FIG. 4 illustrates the cyclic voltammogram of Comparative example C-2.

The cyclic voltammogram of the support coated with $LiMn_2O_4$ according to our invention (Example 2) is recorded in FIG. 3; the cyclic voltammogram of an electrically active film containing sintered $LiMn_2O_4$, prepared according to the state of the art (Comparative example C-2) is recorded in FIG. 4. These two figured immediately show that the electrical activity of the electrically active film according to our invention (Example 2, without high temperature treatment) is as high as that of an electrically active film prepared according to the state of the art (Comparative example C-2, with high temperature treatment).

The normalised (thickness) maximum current density of the electrically active film of Example 3 according to our invention (determined by cyclic voltammetry in the tension range between 1.2 V and 3 V against lithium) was 0.6 $mA/cm^2/\mu m$ at a scanning speed of 20 mV/sec.

The normalised (thickness) maximum current density of the electrically active film of Example 4 according to our invention was, under the same experimental conditions, 1.1 $mA/cm^2/\mu m$ at a scanning speed of 20 mV/sec.

The electrically active film having on top of the electrically active layer an electrically inactive layer (Example 4) has a higher electrical activity than the corresponding electrically active film (Example 3) with only the electrically active layer. Furthermore, the mechanical stability of the electrically active film of Example 4 is excellent.

Finally, variations from the examples given herein are possible in view of the above disclosure. Therefore, although the invention has been described with reference to certain preferred embodiments, it will be appreciated that other coating solutions may be devised and used in the method described herein, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:

1. Electrically active film, comprising a support and having coated thereon at least one electrically active layer containing nanocrystalline, nanoporous transition metal oxides and at least one binder or a mixture of binders, wherein the binder or mixture of binders is cross-linked; and at least one electrically inactive layer, comprising polyvinyl alcohol and $\gamma$—$Al_2O_3$ is on top of said electrically active layer or layers; wherein the support is selected from the group consisting of polyethylene terephthalate, polyethylene naphthalate, polyethylene terephthalate coated with indium tin oxide or metals or polyethylene naphthalate coated with indium tin oxide or metals and the transition metal oxides are selected from the group consisting of $TiO_2$, $Ti_2O_3$, $Nb_2O_5$, $V_2O_5$, $MoO_3$, $MnO_2$, $HfO_2$, $Fe_2O_3$, $Fe_3O_4$, $RuO_2$, $IrO_2$, $CeO_2$, $InO_2$, $TaO_2$, ZnO, $SnO_2$, or indium tin oxide having specific surface values of 10 $m^2/g$ to 400 $m^2/g$.

2. Electrically active film according to claim 1, wherein at least one of the binders is film-forming.

3. Electrically active film according to claim 1, wherein said electrically active layer contains the binder or the mixture of binders in an amount of 0.5% to 20% by weight relative to the total amount of the nanocrystalline, nanoporous transition metal oxides.

4. Electrically active film according to claim 1, wherein said electrically active layer contains the binder or the mixture of binders in an amount of 1% to 10% by weight relative to the total amount of the nanocrystalline, nanoporous transition metal oxides.

5. Electrically active film according to claim 1, wherein said electrically active layer contains the binder or the mixture of binders in an amount of 2% to 5% by weight relative to the total amount of the nanocrystalline, nanoporous transition metal oxides.

6. Electrically active film according to claim 1, wherein the binder or the mixture of binders contains at least one compound selected from the group consisting of polyvinyl alcohol, polyvinylidene fluoride, polyethylene oxide, polyethylene glycol and polyacryl nitrile.

7. Electrically active film according to claim 1, wherein the nanocrystalline, nanoporous transition metal oxide is titanium dioxide in its anatase modification.

8. Electrically active film according to claim 1, wherein said electrically inactive layer is cross-linked with boric acid or borates.

9. Process for the preparation of electrically active film, comprising a support;
   wherein a liquid suspension or colloidal dispersion of the nanocrystalline, nanoporous transition metal oxides is coated onto the support together with a binder or a mixture of binders at a temperature between 5° C. and 60° C.;
   adding a crosslinking agent to the binder or mixture of binders to form at least one electrically active layer; and
   coating at least one electrically inactive layer, comprising polyvinyl alcohol and $\gamma$—$Al_2O_3$ on top of said electrically active layer or layers;
   wherein the coated support is subsequently dried at a temperature below the boiling point (at standard pressure) of the suspension liquid;
   the support is selected from the group consisting of polyethylene terephthalate, polyethylene naphthalate, polyethylene terephthalate coated with indium tin oxide or metals or polyethylene naphthalate coated with indium tin oxide or metals and the transition metal oxides are selected from the group consisting of $TiO_2$, $Ti_2O_3$, $Nb_2O_5$, $V_2O_5$, $MoO_3$, $MnO_2$, $HfO_2$, $Fe_2O_3$, $Fe_3O_4$, $RuO_2$, $IrO_2$, $CeO_2$, $InO_2$, $TaO_2$, ZnO, $SnO_2$, or indium tin oxide having specific surface values of 10 $m^2/g$ to 400 $m^2/g$.

10. Process for the preparation of electrically active film, comprising a support;
    wherein an aqueous colloidal dispersion of the nanocrystalline, nanoporous transition metal oxides is coated onto the support together with a binder or a mixture of binders at a temperature between 20° C. and 55° C.;
    adding a crosslinking agent to the binder or mixture of binders to form at least one electrically active layer; and
    coating at least one electrically inactive layer, comprising polyvinyl alcohol and $\gamma$—$Al_2O_3$ on top of said electrically active layer or layers;
    wherein the coated support is subsequently dried with air at a temperature below 60° C.;

the support is selected from the group consisting of polyethylene terephthalate, polyethylene naphthalate, polyethylene terephthalate coated with indium tin oxide or metals or polyethylene naphthalate coated with indium tin oxide or metals and the transition metal oxides are selected from the group consisting of $TiO_2$, $Ti_2O_3$, $Nb_2O_5$, $V_2O_5$, $MoO_3$, $MnO_2$, $HfO_2$, $Fe_2O_3$, $Fe_3O_4$, $RuO_2$, $IrO_2$, $CeO_2$, $InO_2$, $TaO_2$, $ZnO$, $SnO_2$, or indium tin oxide having specific surface values of 10 $m^2$/g to 400 $m^2$/g.

* * * * *